US011140133B2

(12) United States Patent
Levine et al.

(10) Patent No.: US 11,140,133 B2
(45) Date of Patent: Oct. 5, 2021

(54) LAYER 7 PROXY FOR IMMUTABLE APPLICATION AUDIT TRAILS

(71) Applicant: Cisco Technology, Inc., San Jose, CA (US)

(72) Inventors: Tyler Levine, San Jose, CA (US); Christopher Metz, Danville, CA (US); Zhaoxing Li, Shenyang (CN); Rohan Dhesikan, San Jose, CA (US); David D. Ward, Los Gatos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 161 days.

(21) Appl. No.: 15/952,412

(22) Filed: Apr. 13, 2018

(65) Prior Publication Data

US 2019/0319927 A1  Oct. 17, 2019

(51) Int. Cl.
*H04L 29/06* (2006.01)
*H04L 9/32* (2006.01)
*H04L 29/08* (2006.01)

(52) U.S. Cl.
CPC ........ *H04L 63/0281* (2013.01); *H04L 9/3236* (2013.01); *H04L 67/28* (2013.01); *H04L 63/168* (2013.01); *H04L 69/329* (2013.01)

(58) Field of Classification Search
CPC ..... H04L 9/00; H04L 63/0281; H04L 9/3236; H04L 67/28; H04L 69/329; H04L 63/168; H04W 12/00; G06Q 10/00
See application file for complete search history.

(56) References Cited

U.S. PATENT DOCUMENTS

| 8,429,748 | B2 | 4/2013 | Suit et al. |
| 8,688,828 | B2 | 4/2014 | Yadav et al. |
| 10,104,077 | B1* | 10/2018 | Irwan .................... G06F 21/445 |
| 10,262,127 | B2* | 4/2019 | Subramaniyan ........ G06F 21/10 |
| 10,616,324 | B1* | 4/2020 | Kaddoura ............... H04L 43/04 |
| 2010/0316033 | A1* | 12/2010 | Atwal ................. H04W 74/002 370/338 |
| 2017/0168985 | A1* | 6/2017 | Hwang ................... H04L 67/42 |

(Continued)

FOREIGN PATENT DOCUMENTS

EP  2318914 A1  5/2011

OTHER PUBLICATIONS

International Search Report and Written Opinion in counterpart International Application No. PCT/US2019/025722, dated Jun. 11, 2019, 14 pages.

(Continued)

*Primary Examiner* — Joseph P Hirl
*Assistant Examiner* — Leynna Truvan
(74) *Attorney, Agent, or Firm* — Edell, Shapiro & Finnan, LLC (57) ABSTRACT

A system is provided comprising one or more application layer audit proxies arranged to obtain application layer network traffic sent in a network. Each of the application layer audit proxies configured to: receive application layer network traffic sent as part of a communication session between a producer entity and a consumer entity; record information about the application layer network traffic to an audit log in a distributed permissioned database comprising a blockchain of immutable data blocks; and forward the application layer network traffic to the producer entity or to the consumer entity.

20 Claims, 5 Drawing Sheets

(56) References Cited

U.S. PATENT DOCUMENTS

2017/0264428 A1     9/2017    Seger, II
2017/0364700 A1    12/2017    Goldfarb et al.

OTHER PUBLICATIONS

Klein, "Introduction to modem network load balancing and proxying", Envoy Proxy, https://blog.envoyproxy.io/introduction-to-modern-network-load-balancing-and-proxying-a57f6ff80236, Dec. 27, 2017, 36 pgs.

Dye et al., "Chapter 3: Application Layer Functionality and Protocols", Network Fundamentals, CCNA Exploration Companion Guide, Cisco, Nov. 2007, 36 pgs.

Malone, "Securing the Application Layer", Coalfire, Institute of Internal Auditors, Apr. 10, 2012, 39 pgs.

Romanofski., "A Comparison of Packet Filtering vs. Application Level Firewall Technology," Global Information Assurance Certification Paper SANS Institute, Jan. 2002.

"Manage/ Audit employee's IM/ P2P", InstantScan Features, L7 Networks: Secure Networks Above Layer 7, http://www.I7.com.tw/L7_2016/products.IS_features.eng.php, downloaded from the Internet Feb. 28, 2018, 4 pgs.

"Cloud Assurance", Guardtime, Solutions, https://guardtime.com/solutions/cloud, downloaded from the Internet Feb. 20, 2018, 4 pgs.

"Our Technology", KSI Technology, Industrial Scale Blockchain, Guardtime, https://guardtime.com/technology, downloaded from the Internet Feb. 20, 2018, 4 pgs.

Malaval, "How to Record SSH Sessions Established Through a Bastion Host", AWS Security Blog, Amazon Web Services, Inc., https://aws.amazon.com/cn/blogs/security/how-to-record-ssh-sessions-established-through-a-bastion-host/, Jun. 14, 2016, 11 pgs.

\* cited by examiner

LAYER 7 PROXY FOR IMMUTABLE APPLICATION AUDIT TRAILS

TECHNICAL FIELD

The present disclosure relates to auditing application network traffic.

BACKGROUND

Application clients and servers exchange information over a communications network at what is known as "The Application Layer" or "Layer 7". Operators tasked with ensuring the correct operation of these application clients and servers occasionally need to examine the Layer 7 network traffic exchanged between these clients and servers. Additionally, operators may wish to log the network traffic for audit and compliance reasons.

DESCRIPTION OF EXAMPLE EMBODIMENTS

Overview

In one embodiment, a system is provided comprising one or more application layer audit proxies arranged to obtain application layer network traffic sent in a network. Each of the application layer audit proxies configured to: receive application layer network traffic sent as part of a communication session between a producer entity and a consumer entity; record information about the application layer network traffic to an audit log in a distributed permissioned database comprising a blockchain of immutable data blocks; and forward the application layer network traffic to the producer entity or to the consumer entity.

EXAMPLE EMBODIMENTS

In order to log network traffic for audit and compliance reasons, network operators store the raw network packets to a file on the network device that carries the application traffic. Alternatively, the application traffic audit data may be sent to a central database where audit information is maintained for all applications sending traffic over the network.

There are challenges with these approaches. The application audit data is kept in a single centralized data store (either the local file on the network device, or an audit database). Such data stores are typically modifiable, and as a result, an adversary could gain access to the central data store and modify the application audit data. This could lead an operator to make incorrect conclusions regarding the behavior of applications which are under audit. This allows an adversary to potentially erase or modify information contained in the application audit data which may serve to expose their actions.

Operators examining the application audit data cannot detect if the application audit data has been tampered with or modified after the fact. It can only be assumed that the information contained in the application audit log is genuinely representative of the application traffic which generated it. There is no way to know if the application audit log should not be trusted.

Furthermore, there is no guarantee that application audit data in a centralized data store has a relationship to the original application traffic which produced it. Therefore, the operator has to assume that the application audit data is in fact a faithful representation of the actual underlying application traffic. If, due to some failure in the audit system, or some transient failure on the network it is monitoring, any application traffic fails to be reflected in the central audit data store, or is reflected in the audit store incorrectly, then the conclusions which an operator might draw from the apparent state of the application are likely to be incorrect. This is because the application state that the audit log represents is in fact not correct—it diverged from the actual application state at the point of the failure and cannot be trusted to be accurate after that point.

Operators would like to record their application layer network traffic in a secure, accurate way, so that operators can correctly determine what application action(s) led to a particular undesirable application state. Appropriate application audit trails should not be modifiable after-the-fact, should provide guarantees regarding their accuracy, and should provide some mechanism through which tampering or other attempts at modification can be detected.

Presented herein is a system for creating and managing application layer network traffic audit data stored in a linked chain of data blocks, created and maintained by a network of application layer proxies. Such a system enables a robust, dependable solution to the problems outlined above which may be encountered when applying traditional application auditing techniques.

Each entity and their relationships to the other entities in the system are now described, as well as some terminology concerning properties of the audit system presented herein.

Operator—An entity that is responsible for ensuring the availability and correct operation of a networked application, as well as diagnosing and repairing any issues which may cause degraded operation of the networked application. As part of this responsibility, an Operator may be interested in recording Layer 7 traffic for examination or audit at a later time.

Producer—An entity that produces application layer network traffic which an operator is interested in recording for audit purposes. As a requirement for the correct functioning of the networked application, this application traffic is relayed to a Consumer, where it will be acted upon in some fashion, mutating the current state of the networked application. A Producer may be a stand-alone physical server, a server application process running on a physical machine, a virtual machine running on a server, or any other physical or software-based entity that produces application layer network traffic.

Consumer—An entity that consumes application layer network traffic from a Producer. Upon receiving appropriate application traffic, the Consumer modifies the state of the networked application, so that the networked application can proceed with its work. A Consumer may be a stand-alone physical device, a client application process running on a physical machine, a virtual machine, or any other physical or software-based entity that consumes application layer network traffic.

Data Block—An immutable set of audit records, which are bundled together for storage and processing efficiency reasons.

Data Blockchain—A set of data blocks, which have been linked by embedding the hash value of the previous block in the chain. This means that if any byte of any data block in the chain is tampered with or modified in any way, then the data block's hash value will change. Since this value is written into the subsequent block, during the chain validation process any node can verify that the hash values are in fact not equal, and will deem the whole chain to be invalid (and thus is its contents are not to be trusted).

Layer 7 Audit Proxy—An entity that audits application layer data in a communication session (in one or both directions) between a Producer and a Consumer. For example, the Layer 7 Audit Proxy accepts application layer network traffic from Producers, records any relevant information to the audit log, and then forwards the application layer network traffic on to the correct Consumer. Conversely, the Layer 7 Audit Proxy accepts application layer network traffic from a Consumer, records any relevant information to the audit log, and then forwards the application layer network traffic to the Producer. Additionally, Layer 7 Audit Proxies work together as a clustered networked application to maintain the audit log in a distributed data store consisting of a chain of immutable data blocks. For simplicity, the Layer 7 Audit Proxies are referred to herein as "audit proxies".

Figure 1:
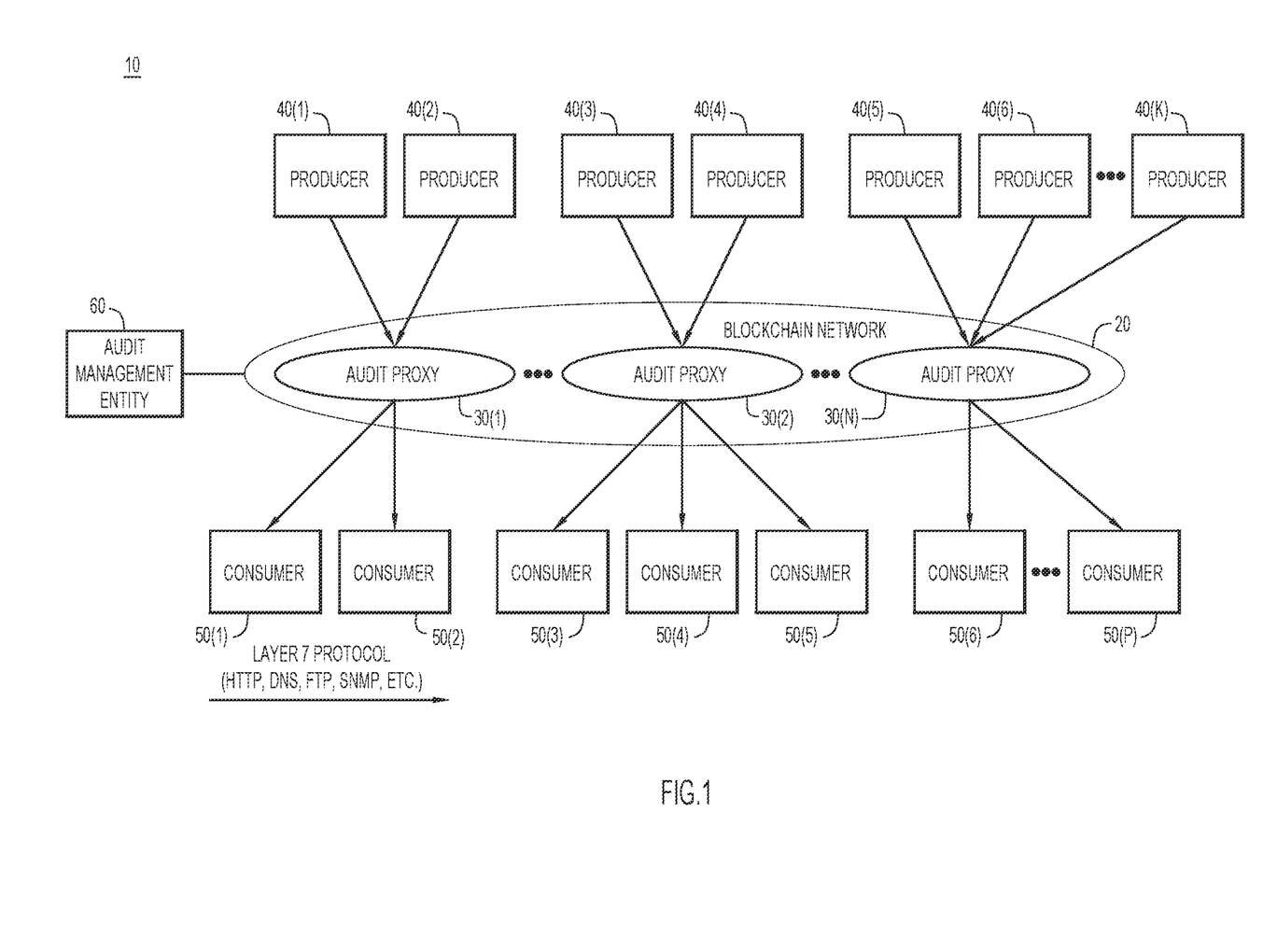
FIG. 1 is block diagram of a system that includes a proxy network of application layer audit proxies configured to perform record an audit trail of application layer network traffic, according to an example embodiment.

Reference is now made to FIG. 1. FIG. 1 shows a system 10 that includes a proxy network 20 that includes one or more audit proxies 30(1)-30(N). The proxy network 20 logically sits between Producers 40(1)-40(K) and Consumers 50(1)-50(P), as shown in FIG. 1, in order to capture application layer network traffic (in one or both directions) sent between Producers and Consumers. The audit proxies 30(1)-30(N) in proxy network 20 are also configured to operate as a Blockchain network as described in more detail below. The Producers 40(1)-40(K) and Consumers 50(1)-50(P) may be entities that reside within an Operator network. There is also an audit management 60 that connects to the proxy network 20 and is configured to access one or more audit trails stored by the audit proxy network 20 in order facilitate analysis of the audit data to ensure compliance with whatever requirements the Operator may have for a given application operating in its network. The audit management entity 60 may be a stand-alone server or may be a server application running in the cloud or on any device having connectivity to the proxy network 20.

The audit proxies 30(1)-30(N) each work like a reverse proxy. A reverse proxy is a type of proxy server that retrieves resources on behalf of a client (Consumer) from one or more servers (Producers). The reverse proxy returns the resources to the client (Consumer) as if they originated from the server (Producer). Unlike a forward proxy, which is an intermediary for its associated clients to contact any server, a reverse proxy is an intermediary for its associated servers to be contacted by any client. As a result, no changes are required to the Producer and Consumers to enable the audit system presented herein. The Consumer and Producer are not even aware that the audit proxy network 20 is present.

At the top of the OSI Reference Model stack of layers is Layer 7, the application layer. The application layer is the layer that is used by network applications. These programs are what actually implement the functions performed by users to accomplish various tasks over the network. In the OSI model, the application layer provides services for user applications to employ. For example, sending an e-mail, opening up a web browser, or using a chat program, all involve protocols that reside at the application layer.

There are dozens of different application layer protocols that enable various functions at this layer. Some of the more common Layer 7 protocols include: Hypertext Transfer Protocol (HTTP), File Transfer Protocol (FTP), Domain Name System (DNS), Simple Mail Transfer Protocol (SMTP), Simple Network Management Protocol (SNMP), Dynamic Host Configuration Protocol (DHCP), POP3, etc.

The mechanism presented herein of storing application traffic audit data ensures that all entries in the audit log are immutable and tamper-evident. It is also possible to prove the audit log to be correct, assuming that the audit log possesses a few simple properties, which are described below.

In one embodiment, Consumers and an audit proxies nodes be deployed side-by-side (i.e., on the same piece of physical hardware). This would allow operators to run the audit proxies on the same hardware that is already running an application server, saving some deployment and ongoing maintenance costs.

The audit proxies 30(1)-30(N) (hereinafter also referred to as "proxy nodes") have the ability to exchange Layer 7 traffic with any relevant Producers or Consumers. Operators may provision multiple proxy nodes for availability, redundancy, and load management reasons. In this case, all participating proxy nodes have the ability to exchange Layer 7 traffic among each other, forming a network of proxy nodes. Such proxy nodes are also referred to as "proxy peers" once they are all mutually configured to form a network. Acting together, these proxy peers carry out the application audit process. Such a network of proxy peers is also referred to as a "proxy network".

The operation of an audit proxy is now briefly described, though more details of audit proxy operations are provided below. When an audit proxy receives traffic, it performs a lookup in its Layer 7 session lookup table to determine whether it the traffic is one of the Layer 7 sessions the audit proxy is to watch. If the traffic belongs to one of the Layer 7 sessions the proxy is watching, the proxy will copy the traffic to a blockchain service/function of the audit proxy. The audit proxy also forwards the traffic to the original receiver/destination of the traffic. The blockchain service/function selectively uploads the copied traffic to the blockchain as described in more detail below.

The blockchain service/function may consume more time, among the various functions of the audit proxy. Accordingly, it may be performed separately, without having to block the normal forwarding workflow of the audit proxy. Specifically, the audit proxy would only need to dump the traffic to a first-in first-out (FIFO) pipeline where the blockchain service/function of the audit proxy could pick it up for further processing and uploading.

While FIG. 1 illustrates a meshed topology between the Consumers, audit proxies, and Producers, in an actual/real deployment, however, the topology may be slightly different. The audit proxy may be placed at an edge of the network/cloud together with the server being proxied. Consider a (Container-as-a-Service) (CaaS) environment for example, where a single Vector Packet Processing (VPP) switch handles traffic for several server pods on the same host with the help of its userspace Transport Control Protocol (TCP) stack. In this scenario, a specific TCP connection between the same client and server pair most likely would be handled by the same VPP instance, the same server pod, and the same proxy. This would allow the proxy to gain enough context on the L7 communication between the server and client pair, since starting from HTTP/2, the duration of a single TCP session has been able to cover more than one HTTP request/reply session.

In one embodiment, the proxy network 20 may be part of the Operator network as described above, or part of a third-party network. If the proxy network 20 is part of a third-party network, it may be desirable to ensure that the traffic is encrypted, in which case the proxy network would only be able to record encrypted traffic in the Blockchain.

To provide further protection for the audit logs, the audit proxies may encrypt the data to be stored in the blockchain with the private key of the data owner, so that their contents are only visible to limited parties.

Example Workflow

Figure 2:
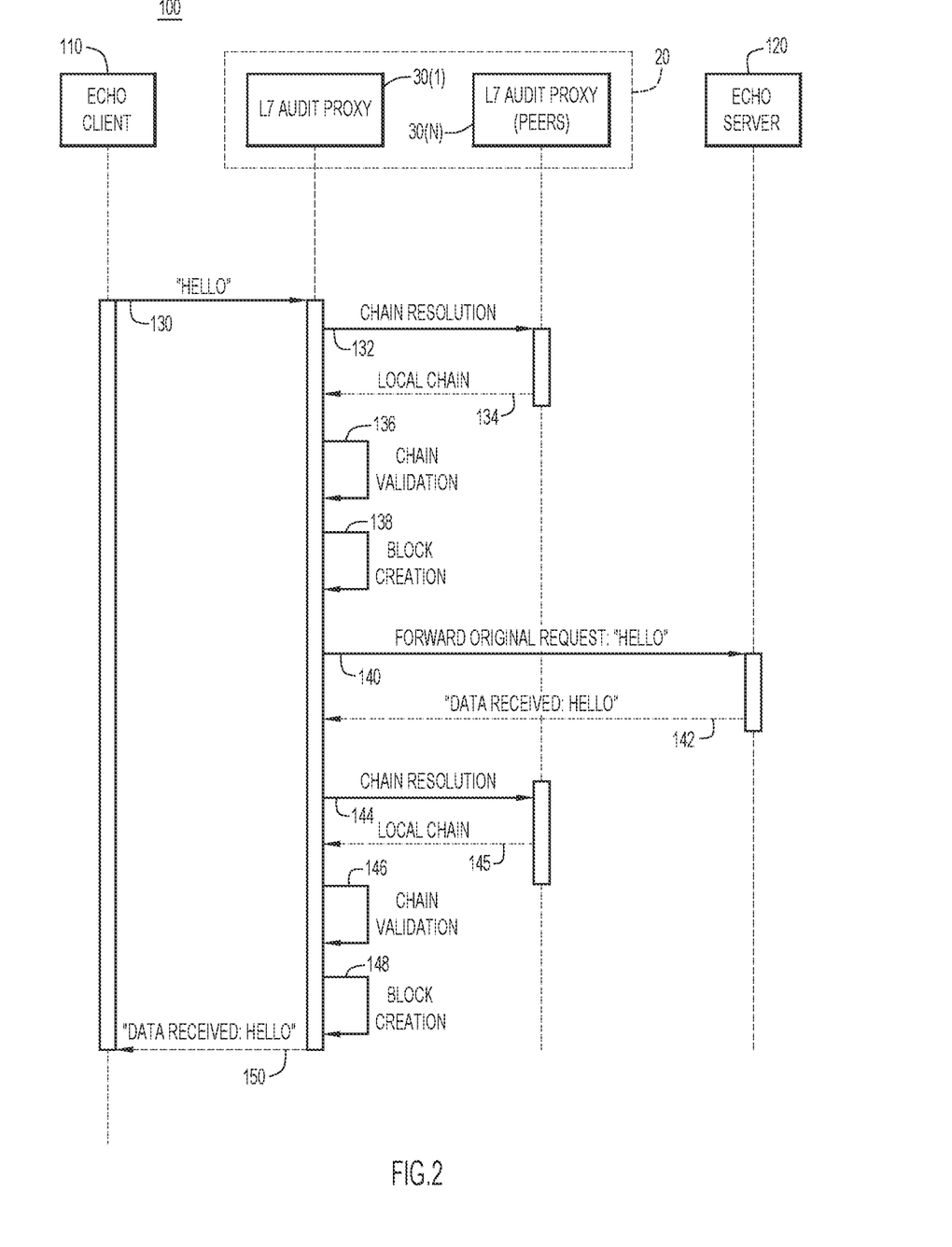
FIG. 2 is a sequence diagram illustrating operations performed by the application layer audit proxies in connection with a communication session between a client and a server, according to an example embodiment.

Reference is now made to FIG. 2. FIG. 2 illustrates a sequence diagram for an example workflow 100 according to an example embodiment. In the example of FIG. 2, there is a hypothetical networked application, called EchoService, which an Operator would like to audit. EchoService is very simple, it consists of a server which accepts HTTP requests from EchoService clients, and responds with an HTTP response. The body of the response will contain any data present in the body of the original request, with the string "Received data:" prepended to the request data. Thus, in this example, there is an Echo Client 110 that acts as a Consumer and an Echo Server 120 that acts as a Producer. The proxy network 20 includes audit proxies 30(1)-30(N) which logically sit between the Echo Client 110 and the Echo Server 120.

The operator of EchoService is interested in logging application network traffic associated with EchoService for audit or compliance reasons. In order to connect to the Echo Client 110 (the Consumer), the Echo Server 120 (the Producer) will first open a connection to the proxy node which it has been configured to use. In turn, the proxy node will establish a connection to the appropriate Consumer, and begin monitoring each side of the connection for application data transmissions. Thus, the proxy node has established a man-in-the-middle position for the purpose of recording relevant application audit data to a distributed chain of immutable data blocks. In the example of FIG. 2, the audit proxy 30(1) has been assigned to EchoService to use for audit functions.

FIG. 2 shows the role played by the Layer 7 Audit Proxy. Audit data associated with traffic between the networked application's client and server is stored inside a block and added to the chain, thereby creating an immutable record of all data exchanged between the client and the server.

Upon receiving application data from either the Consumer side or the Producer side, the first action taken by the audit proxy is to send to each of the other audit proxies (audit proxy peers) in proxy network 20 a request for the length of their local data block chain. This is called chain resolution and involves choosing the longest such chain so as to ensure that when any attempt is made to write new data into the audit log, the longest available chain in the proxy network 20 will be used. This is performed to avoid writing conflicting data to different local versions of the data chain.

For example, at 130, the Echo Client 110 sends a "Hello" communication destined for the Echo Server 120. The audit proxy 30(1) assigned to perform audit functions for EchoService receives the "Hello" communication. At 132, the audit proxy 30(1) performs chain resolution to find the longest chain in the proxy network 20 by communicating with proxy peers in the proxy network 20.

This longest found chain is then validated by hashing each data block in the chain and comparing the calculated hashes to the hashes written in the subsequent block, and also with the hashes for the corresponding blocks in the local chain. If all calculated hashes match the hashes written into each subsequent block, then the audit proxy 30(1) can declare the chain as valid and authoritative (and such a chain is hereafter referred to as the "Network Chain"). If the chain cannot be successfully validated, then the audit proxy 30(1) cannot use that chain as a base for any new data blocks. In this case, audit proxy 30(1) must once again connect to its proxy peers in the proxy network 20 to determine the next longest chain and attempt to validate it. This chain resolution process 132 repeats until a valid chain is found which is longer than the local chain of the audit proxy 30(1). If the audit proxy 30(1) determines that there is no chain in the proxy network that is longer than its local chain, then the audit proxy 30(1) uses its local chain as the authoritative Network Chain as shown at 132.

Once the authoritative Network Chain has been located, at 134, the local chain is updated to include any data blocks which were discovered from the Network Chain. Then, the Proxy Node creates a new data block containing the application audit data which the Operator would like to persist.

Prior to creating a new data block, and in order to append a newly created data block to the Network Chain, the audit proxy 30(1) performs chain validation at 136 to ensure that the block can be validated by the proxy peers. This involves calculating the hash value of the most recent block on the Network Chain. Once calculated, this hash value is written into the new block. This ensures that any modification to the most recent block in the Network Chain will be detectable, as it will change the value of the hash calculated over the most recent block. During chain validation performed by another audit proxy at some later point in time, this will cause a mismatch between the value written in the subsequent block's "Previous Block Hash" field, and the calculated hash value.

Once the previous block's hash is calculated and written into the new block, the new block can be appended at 138 to the chain and thus becomes part of the Network Chain. Since the length of the Network Chain is extended by adding a new valid block, the proxy peers will recognize this chain as the new Network Chain when they need to create a new data block, thus providing a mechanism by which all proxy peers can agree on the authoritative Network Chain.

At 140, the audit proxy forwards the original communication from the Echo Client 110 to the Echo Server 120. At 142, the Echo Server 120 sends a response communication "Data Received: Hello" intended for the Echo Client 110. The audit proxy 30(1) receives the response communication from the Echo Server 120. At operations 144, 145, 146 and 148, the chain resolution, local chain update, chain validation and block creation steps are performed in a similar manner to operations 132, 134, 136 and 138 described above, in order to add a block to the authoritative Network Chain for the communication 142 sent by the Echo Server 120. At 150, the audit proxy 30(1) forwards the "Data Received: Hello" communication to the Echo Client 110.

This process repeats for each communication sent between the Echo Client 110 and the Echo Server for application layer network traffic sent during a communication session.

Figure 3:
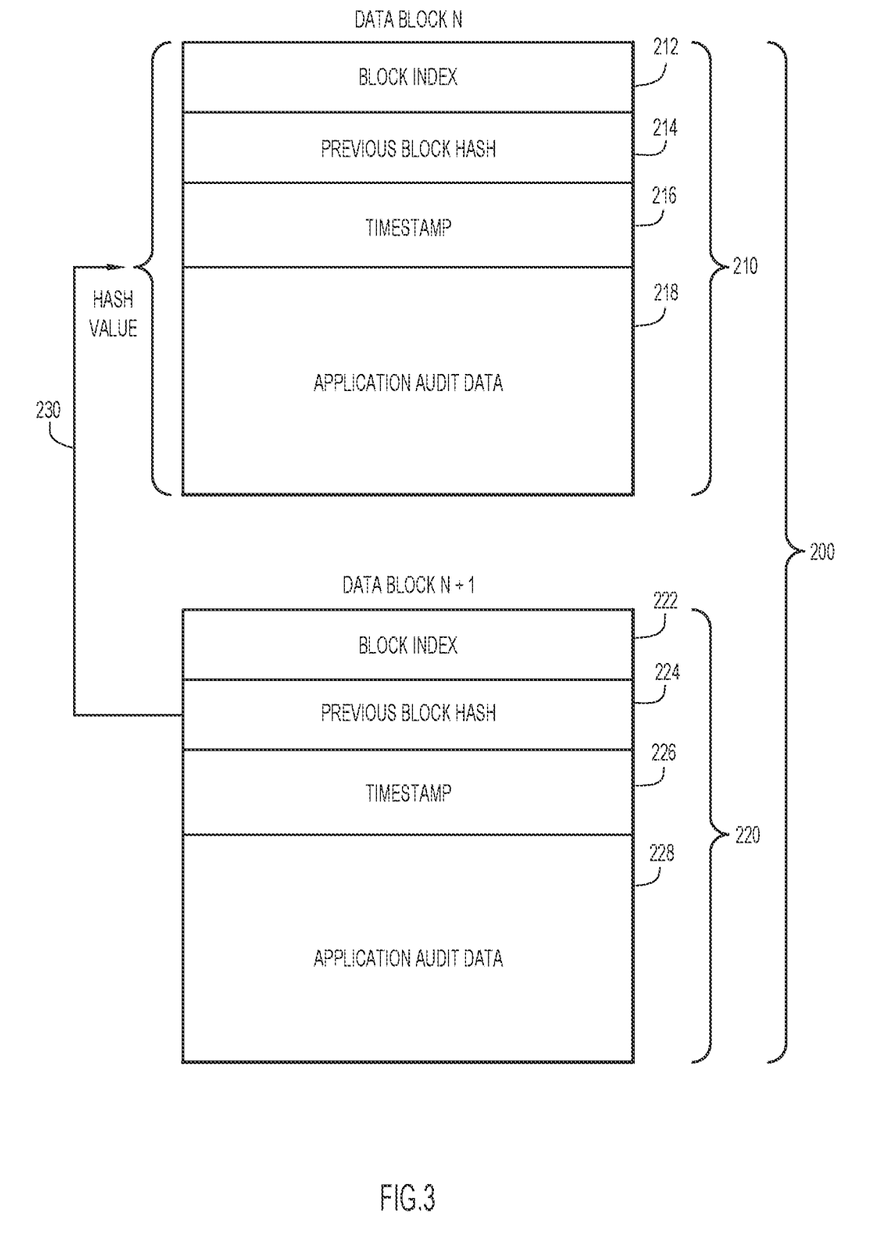
FIG. 3 is a diagram illustrating how application audit data is recorded in a blockchain, according to an example embodiment.

Reference is now made to FIG. 3. FIG. 3 shows two consecutive data blocks in a blockchain 200. Specifically, block chain 200 includes data block N shown at reference numeral 210 and data block N+1 shown at reference numeral 220. Data block 210 includes a block index 212, previous block hash 214, timestamp 216 and application audit data 218. Similarly, data block 220 includes a block index 222, previous block hash 224, timestamp 226 and application audit data 228.

As shown at 230 in FIG. 3, and as described above in connection with FIG. 2, a hash is computed from (the entirety of) data block N (the most recent data block on the chain 200) and the resulting hash value is written into the previous block hash field 224 of the next/new data block N+1. Again, this ensures that any modification to the most recent block N in the chain 200 will be detectable, as it will change the value of the hash calculated over the most recent block. During chain validation performed by another audit proxy at some later point in time, this will cause a mismatch between the value written into the previous block hash field 224 of the next block 220, and the calculated hash value.

The audit proxies need not use Proof-of-Work as a mechanism to post data into the blockchain. The blockchain in this system is a private blockchain, and not open to participation by just any entity with sufficient computation power. Instead, the audit proxy needs to prove that it is actually acting as an audit proxy for a specific server. Specifically, a "Proof-of-Proxy" mechanism may be employed, where the other audit proxies could send a specific request to the server, for which request the proxy should be able to intercept the server's response and encrypt it with its private key. The other proxies would then be able to decrypt the server response with the proxy's public key and be able to confirm that the proxy really has the ability to "proxy" between the server and client, thus legitimate to participate in the blockchain.

Another method to implement "Proof-of-Proxy" is to provide a way for a Consumer to authorize a proxy to intercept traffic destined for it. The proxy could then present this authorization as a way to access the blockhain network. The potential drawback with this approach is that it requires support from the Consumer which may not be desirable.

It may also be desirable to avoid the possibility of a single proxy being compromised and flooding the blockchain with block writes. This could be prevented by introducing a turn-based mechanism, limiting the ability of proxies to write new blocks in a certain consecutive number of block writes. For example, each proxy might only be able to write a new block in every N consecutive blocks, with floor(M/2)+1<N<M, where M is the number of proxies participating in the blockchain at the time of the block write operation and floor(x) is the floor function that produces an output the greatest integer less than or equal to (x).

The proxy network described herein may be deployed in a Layer 7 mesh network where there exists one or more administrative domains (e.g. a cloud native application in a hybrid cloud). Services in the Layer 7 mesh network described above may be deployed across these different administrative domains. The audit proxies may be interconnect proxies in these administrative domains, providing a unified audit trail for one or more services deployed in the Layer 7 mesh network. Since the services may reside at the very edge of the Layer 7 mesh network, the proxy may be useful for recording what happens between services in the same administrate domain or between a specific service and an external administrative domain. Architecturally, the proxy could simply work as a filter to monitor and record any service traffic ingressing, egressing or transiting the Layer 7 mesh network.

Example Application Audit Data

The following terms are defined for describing example application audit data.

Raw Data: The information included in a Layer 7 communication session between producers and consumers, which is intercepted by the audit proxy. Network packet headers are also part of this Raw Data.

Context: The information related to a specific audit session of Layer 7 communications between consumers and producers. Normally, the information should include the identity of the producer, consumer, and the audit proxy publishing this audit data, the timestamp of this audition, as well as any information (like data schemas) which might help better understand the audit data.

Audit Data: A key-value store which includes the selected audit data derived from the original communications between producers and consumers (i.e. Raw Data). Each Audit Data has a Context section.

Scenario A:

The first type of data auditable by the proxy is from Layer (L7) protocols which have known schemas for Raw Data. For example, NETCONF, which is an L7 network management protocol, has RFC specifications of its full communication workflow and default data schemas. See RFC6241-Network Configuration Protocol (NETCONF) https://tools.ietforg/html/rfc6241. Furthermore, device-specific schemas would be exchanged between the producer and consumer at the beginning of a NETCONF session. As a result, the audit proxy could leverage these schemas to interpret the Raw Data of NETCONF communications between producers and consumers. It is also possible for users to specify filters which would allow the audit proxy to include only selected Raw Data in the Audit Data which is stored in the blockchain.

For example, a producer, with IP address 10.0.0.2, sent a NETCONF "edit-config" message [Sample Raw Data 1] to a consumer, with IP address 10.0.1.2, intending to add an IPv6 address (2001:db8:a::123/64) in the eth1 interface of the consumer. The message was intercepted by the audit proxy (IP: 10.0.1.3) at 23:00, Mar. 1, 2018, UTC. Since the XML schema of this NETCONF message is public knowledge, it is possible for the audit proxy to interpret this payload, and publish the Audit Data of this communication into the blockchain [Sample Audit Data 1].

Sample Raw Data 1 (In the format of XML):

```
<rpc message-id="1" xmlns="urn:ietf:params:xml:ns:netconf:base:1.0">
    <edit-config>
        <target>
            <candidate/>
        </target>
        <config>
            <interfaces xmlns="urn:ietf:params:xml:ns:yang:ietf-interfaces">
                <interface>
                    <name>eth1</name>
                    <ipv6 xmlns="urn:ietf:params:xml:ns:yang:ietf-ip">
                        <address>
                            <ip>2001:db8:a::123</ip>
                            <prefix-length>64</prefix-length>
                        </address>
                    </ipv6>
                </interface>
            </interfaces>
        </config>
    </edit-config>
</rpc>
```

Sample Audit Data 1 (In the format of YAML to depict a key-value structure):

```
Audition:
    uuid: c8c2b049-93bc-44b4-be2f-e0a807db6dbd
    context:
        producer information:
            producer IP: 10.0.0.2
        consumer information:
            consumer IP: 10.0.1.2
        audit proxy Information:
            Proxy IP: 10.0.1.3
        audition timestamp: 23:00, Mar 1, 2018, UTC
    audit payload:
        L7 protocol: NETCONF
        NETCONF:
            RPC:
                schema: urn:ietf:params:xml:ns:netconf:base:1.0
                target: candidate
                operation type: edit-config
                content:
                    interfaces:
                        - name: eth1
                          ipv6 address: 2001:db8:a::123/64
```

Scenario B:

The second type of data auditable by the proxy is from L7 protocols which have unknown data schemas for the Raw Data. For example, most HTTP communications have application-specific schemas for the data payload. If users failed to provide this schema to the audit proxy, it would be unable to make sense of the data payload as in scenario A. There are two possible strategies for the audit proxy to take:

Strategy 1:

Store all the Raw Data as the Audit Data. This will provide full data record which could be analyzed in the future when the data schema is available.

Strategy 2:

Store only a cryptographic hash (for example, via SHA-256 algorithm) of the Raw Data as the Audit Data. Although the Raw Data would be lost, the hash could serve as a Proof of Transit which shows that this specific raw data has passed through the audit proxy.

Application Audit Data Guarantees

The main guarantee provided by the Layer 7 Audit Proxy system described herein is that of audit integrity. In other words, if a data chain produced by this system can be successfully validated, then the data contained in the audit data chain has not been modified since the data block containing that data was created. This guarantee holds as long as at least one member of the proxy network has an unmodified chain which can be successfully validated. Thus, even if an attacker can gain unauthorized access to some subset of the proxy peers, the attacker cannot modify the audit data stored in the block chain, as such an attack would cause chain validation errors when the other proxy peers attempt to validate the chain.

To successfully carry out such an attack, an attacker would need to gain unauthorized write access to the majority of the proxy peers in the proxy network. This access is strictly more difficult to attain, compared with gaining unauthorized access to a single central audit database server. Additionally, this process leaves some opportunity to detect modifications to the audit log, providing some clue that its contents may not be trustworthy. In contrast, the centralized audit database server solution provides no such mechanism for modification detection Blockchains do not require each participant to approve a block write, since the chain resolution process only requires the block write to be on the longest chain, which could be achieved by the majority of the participants already.

Figure 4:
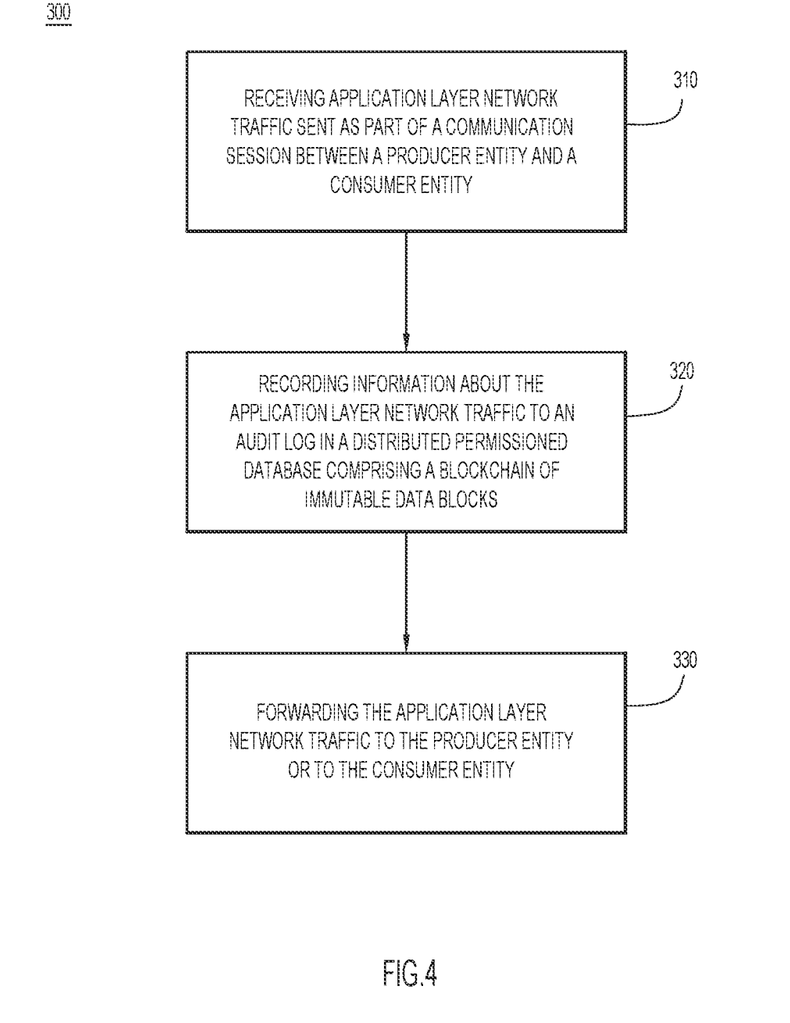
FIG. 4 is a flow chart of a method for recording application layer audit data, according to an example embodiment.

Reference is now made to FIG. 4. FIG. 4 illustrates a flow chart of a method 300 according to an example embodiment. The method 300 may be performed by one or more application layer audit proxies arranged to obtain application layer network traffic in a network. At 310, the application layer audit proxy receives application layer network traffic sent as part of a communication session between a producer entity and a consumer entity. At 320, the application layer audit proxy records information about the application layer network traffic to an audit log in a distributed permissioned database comprising a blockchain of immutable data blocks. At 330, the application layer audit proxy forwards the application layer network traffic to the producer entity or to the consumer entity.

As described above in connection with FIG. 1, there may be a plurality of application layer audit proxies that form a proxy network. Furthermore, as described above in connection with FIGS. 2 and 3, a first application layer audit proxy of the plurality of application layer audit proxies may be configured to: in response to receiving application layer network traffic, send to each of the other application layer audit proxies in the proxy network, a request for a length of its local data blockchain; and select a longest blockchain among the other application layer audit proxies for writing new data into the audit log. The first application layer audit proxy may be further configured to validate the longest blockchain based on a comparison of hashes computed of each data block in the longest blockchain and a hash computed for a subsequent block in the longest blockchain. Moreover, the first application layer audit proxy may be further configured to: select a next longest blockchain if the longest blockchain cannot be validated; and if no blockchain among the other application layer audit proxies in the proxy network can be validated, select a local blockchain at the first application layer audit proxy to be used for the audit log.

As explained above in connection with FIGS. 2 and 3, each application layer audit proxy records information to the audit log by writing to a current data block of the blockchain a hash value computed from a hash computation of an entirety of a previous data block in the blockchain.

Furthermore, as described in connection with FIG. 2, each application layer audit proxy is configured to: receive from the consumer entity a request destined for the producer entity; record audit information derived from the request to the audit log; forward the request to the producer entity; receive from the producer entity a response destined for the consumer entity; record audit information derived from the response to the audit log; and forward the response to the consumer entity.

Figure 5:
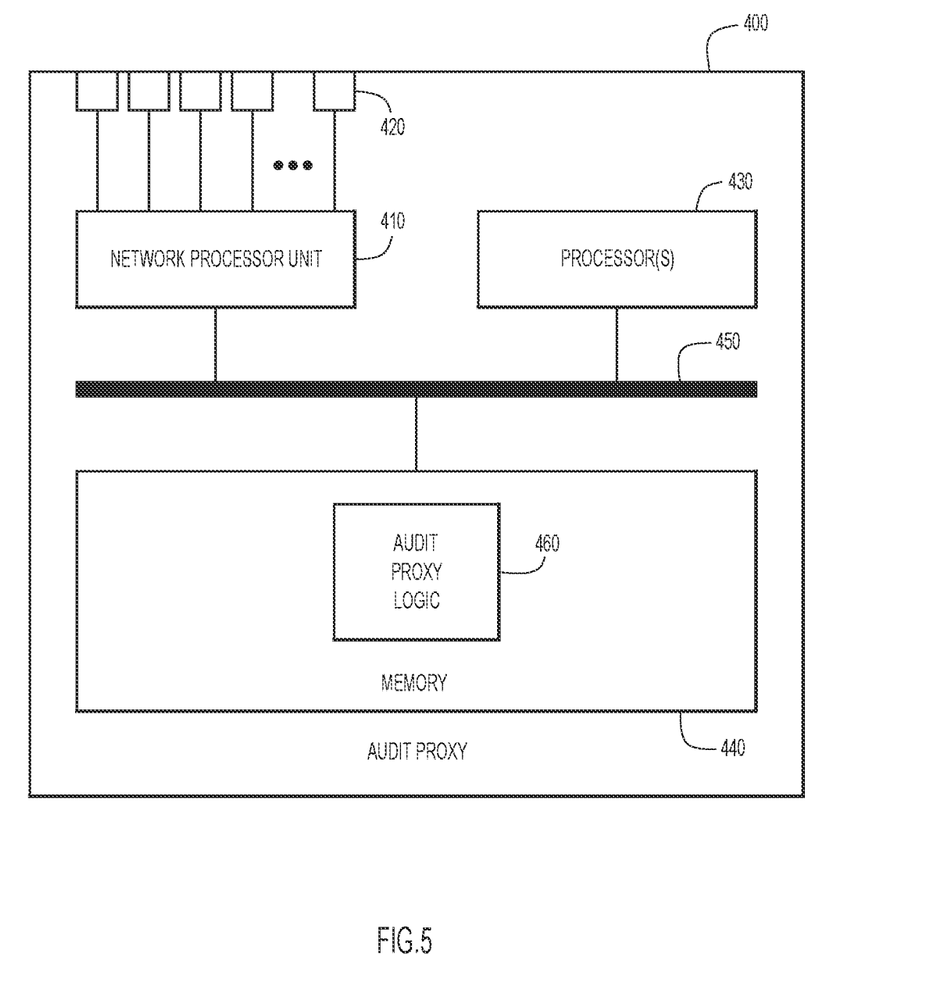
FIG. 5 is a block diagram of an application layer audit proxy, according to an example embodiment.

Turning now to FIG. 5, a block diagram is shown of an application layer audit proxy generically identified by reference numeral 400, according to an example embodiment. The audit proxy 400 is representative of the form that any of the audit proxies 30(1)-30(N) referred to above may take. The audit proxy 400 may take the form of a computing apparatus, e.g., a server, which has network connectivity. To this end, the audit proxy 400 includes a network interface 410 having a plurality of ports 420 at which network traffic may be received and from which network traffic may be sent/forwarded by the audit proxy 400. The audit proxy 400 further includes a processor 430 (or multiple processors) and memory 440 and a bus 450. The network interface 410, processor 430 and memory 440 may be connected to the bus 450. The memory stores executable instructions for audit proxy logic 460, which when executed by the processor 430, cause the processor 430 to perform the audit proxy operations described herein.

The memory 440 may be read only memory (ROM), random access memory (RAM), magnetic disk storage media devices, optical storage media devices, flash memory devices, electrical, optical, or other physical/tangible memory storage devices. Thus, in general, the memory 440 may comprise one or more tangible (non-transitory) computer readable storage media (e.g., a memory device) encoded with software comprising computer executable instructions and when the software is executed (by the processor 420) it is operable to perform the operations described herein.

In summary, operators of networked applications would like to record their application layer network traffic in a secure, accurate way, allowing such operators to correctly determine what application action(s) led to a particular undesirable application state. A system and method are presented herein for securely creating and managing application layer network traffic audit data stored in a linked chain of data blocks. This "audit chain" is created and maintained by a network of application layer (or Layer 7) proxies. Such a system enables a robust, dependable which solves several issues which may be encountered when applying traditional application auditing techniques to networked applications.

In one form, a system is provided comprising: one or more application layer audit proxies arranged to obtain application layer network traffic sent in a network, each of the application layer audit proxies configured to: receive application layer network traffic sent as part of a communication session between a producer entity and a consumer entity; record information about the application layer network traffic to an audit log in a distributed permissioned database comprising a blockchain of immutable data blocks; and forward the application layer network traffic to the producer entity or to the consumer entity.

In another form, a method is provided comprising: at one or more application layer audit proxies arranged to obtain application layer network traffic sent in a network: receiving application layer network traffic sent as part of a communication session between a producer entity and a consumer entity; recording information about the application layer network traffic to an audit log in a distributed permissioned database comprising a blockchain of immutable data blocks; and forwarding the application layer network traffic to the producer entity or to the consumer entity.

In another form, an apparatus is provided comprising: a network interface configured to receive and send traffic in a network, including application layer network traffic sent as part of a communication session between a producer entity and a consumer entity; a processor coupled to the network interface, and configured to: record information about the application layer network traffic to an audit log in a distributed permissioned database comprising a blockchain of immutable data blocks; and cause the application layer network traffic to be forwarded by the network interface to the producer entity or to the consumer entity.

In still another form, one or more non-transitory computer readable storage media are provided, encoded with executable instructions that, when executed by a processor at one or more application layer audit proxies arranged to obtain application layer network traffic sent in a network, cause the processor to perform operations including: receiving application layer network traffic sent as part of a communication session between a producer entity and a consumer entity; recording information about the application layer network traffic to an audit log in a distributed permissioned database comprising a blockchain of immutable data blocks; and forwarding the application layer network traffic to the producer entity or to the consumer entity.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A system comprising:
a plurality of application layer audit proxies arranged to obtain application layer network traffic sent in a network, each of the plurality of application layer audit proxies includes at least a network interface configured to receive and send the application layer network traffic in the network and a processor configured to:
receive, via the network interface, the application layer network traffic sent as part of a communication session between a producer entity and a consumer entity;
in response to receiving the application layer network traffic, determine a blockchain of immutable data blocks for recording information into an audit log in a distributed permissioned database, wherein the blockchain is a longest blockchain from among a plurality of blockchains available to the plurality of application layer audit proxies;
record the information about the application layer network traffic to the audit log comprising the blockchain and based on the blockchain, detect whether the audit log has been modified; and
forward the application layer network traffic to the producer entity or to the consumer entity,
wherein the plurality of application layer audit proxies are reverse proxies that retrieve resources on behalf of the consumer entity and form a proxy network, and a first application layer audit proxy of the plurality of application layer audit proxies is configured to:
in response to receiving the application layer network traffic, perform a lookup operation to determine whether the communication session of the application layer network traffic is assigned to the first application layer audit proxy, and
in response to determining that the application layer network traffic is assigned to the first application layer audit proxy, record the information about the application layer network traffic to a local blockchain.

2. The system of claim 1, wherein the first application layer audit proxy is further configured to:
in response to receiving the application layer network traffic, send to each of the other application layer audit proxies in the proxy network, a request for a length of a respective local data blockchain associated with a respective one of the other application layer audit proxies;
receive, from each of the other application layer audit proxies, a response including the length of the respective local data blockchain; and
based on the response from each of the other application layer audit proxies, select the longest blockchain among the other application layer audit proxies for writing new data into the audit log.

3. The system of claim 2, wherein the first application layer audit proxy is further configured to:
  validate the longest blockchain based on a comparison of hashes computed of each data block in the longest blockchain and a hash computed for a subsequent block in the longest blockchain.

4. The system of claim 3, wherein the first application layer audit proxy is further configured to:
  select a next longest blockchain if the longest blockchain cannot be validated; and
  when no blockchain among the other application layer audit proxies in the proxy network can be validated, select the local blockchain to be used for the audit log.

5. The system of claim 1, wherein each application layer audit proxy records information to the audit log by writing, to a current data block of the blockchain, a hash value computed from a hash computation of an entirety of a previous data block in the blockchain.

6. The system of claim 1, wherein each of the plurality of application layer audit proxies is configured to:
  receive from the consumer entity a request destined for the producer entity;
  record first audit information derived from the request to the audit log;
  forward the request to the producer entity;
  receive from the producer entity a response destined for the consumer entity;
  record second audit information derived from the response to the audit log; and
  forward the response to the consumer entity.

7. The system of claim 1, wherein the processor is further configured to:
  execute a chain resolution procedure in which the longest blockchain available to the plurality of application layer audit proxies is determined; and
  determine an authoritative network chain based on the longest blockchain that is valid and available to the plurality of application layer audit proxies based on a comparison of first hashes computed for each data block in the longest blockchain with second hashes written in a respective subsequent block in the longest blockchain, and with third hashes for a corresponding block in a local blockchain of a respective one from among the plurality of application layer audit proxies.

8. The system of claim 1, where the processor is further configured to determine whether the first application layer audit proxy is to record the information about the application layer network traffic to the audit log based on a floor function that restricts a number of new consecutive blocks a single proxy is to record.

9. The system of claim 1, wherein the proxy network is configured to provide the audit log to a network operator management entity that analyzes the audit log to ensure compliance with network requirements, wherein the audit log includes context of the communication session and one or more operation types specified in the application layer network traffic.

10. A method comprising:
  at a first application layer audit proxy of a plurality of application layer audit proxies arranged to obtain application layer network traffic sent in a network, wherein the plurality of application layer audit proxies are reverse proxies that retrieve resources on behalf of a consumer entity and form a proxy network:
    receiving the application layer network traffic sent as part of a communication session between a producer entity and the consumer entity;
    in response to receiving the application layer network traffic, performing a lookup operation to determine whether the communication session of the application layer network traffic is assigned to the first application layer audit proxy and determining a blockchain of immutable data blocks for recording information into an audit log in a distributed permissioned database, wherein the blockchain is a longest blockchain from among a plurality of blockchains available to the plurality of application layer audit proxies;
    in response to determining that the application layer network traffic is assigned to the first application layer audit proxy, recording, by the first application layer audit proxy, the information about the application layer network traffic to a local blockchain;
    recording the information about the application layer network traffic to the audit log comprising the blockchain and based on the blockchain, detecting whether the audit log has been modified; and
    forwarding the application layer network traffic to the producer entity or to the consumer entity.

11. The method of claim 10, further comprising:
  in response to receiving the application layer network traffic, sending, by the first application layer audit proxy, to each of the other application layer audit proxies in the proxy network, a request for a length of a local data blockchain associated with a respective one of the other application layer audit proxies;
  receiving, by the first application layer audit proxy, from each of the other application layer audit proxies, a response including the length of a respective local data blockchain; and
  based on the response from each of the other application layer audit proxies, selecting, by the first application layer audit proxy, the longest blockchain among the other application layer audit proxies for writing new data into the audit log.

12. The method of claim 11, further comprising:
  validating, by the first application layer audit proxy, the longest blockchain based on a comparison of hashes computed of each data block in the longest blockchain and a hash computed for a subsequent block in the longest blockchain.

13. The method of claim 12, further comprising:
  selecting, by the first application layer audit proxy, a next longest blockchain if the longest blockchain cannot be validated; and
  when no blockchain among the other application layer audit proxies in the proxy network can be validated, selecting, by the first application layer audit proxy, the local blockchain to be used for the audit log.

14. The method of claim 10, further comprising each application layer audit proxy recording information to the audit log by writing to a current data block of the blockchain a hash value computed from a hash computation of an entirety of a previous data block in the blockchain.

15. The method of claim 10, further comprising each of the plurality of application layer audit proxies:
  receiving from the consumer entity a request destined for the producer entity;
  recording first audit information derived from the request to the audit log;
  forwarding the request to the producer entity;
  receiving from the producer entity a response destined for the consumer entity;

recording second audit information derived from the response to the audit log; and forwarding the response to the consumer entity.

16. An apparatus comprising:
a network interface configured to receive and send traffic in a network, including application layer network traffic sent as part of a communication session between a producer entity and a consumer entity;
a processor coupled to the network interface, and configured to:
   in response to receiving the application layer network traffic, determine a blockchain of immutable data blocks for recording information into an audit log in a distributed permissioned database, wherein the blockchain is a longest blockchain from among a plurality of blockchains available to the apparatus;
   record the information about the application layer network traffic to the audit log comprising the blockchain, and based on the blockchain, detect whether the audit log has been modified; and
   cause the application layer network traffic to be forwarded by the network interface to the producer entity or to the consumer entity,
wherein the apparatus is a first application layer audit proxy among a plurality of application layer audit proxies that are reverse proxies that retrieve resources on behalf of the consumer entity and that form a proxy network, the processor is further configured to:
   in response to receiving the application layer network traffic, perform a lookup operation to determine whether the communication session of the application layer network traffic is assigned to the apparatus, and
   in response to determining that the application layer network traffic is assigned to the apparatus, record the information about the application layer network traffic to a local blockchain.

17. The apparatus of claim 16, wherein the processor is configured to record information to the audit log by writing, to a current data block of the blockchain, a hash value computed from a hash computation of an entirety of a previous data block in the blockchain.

18. The apparatus of claim 17, wherein the processor is configured to validate the blockchain based on a comparison of hashes computed of each data block in the blockchain and a hash computed for a subsequent block in the blockchain.

19. The apparatus of claim 16, wherein the processor is configured to:
   record, to the audit log, first audit information derived from a request by the network interface from the consumer entity, the request destined for the producer entity;
   forward the request to the producer entity;
   record, to the audit log, second audit information derived from a response received from the producer entity, the response destined for the consumer entity; and
   forward the response to the consumer entity.

20. The apparatus of claim 16, wherein the processor is further configured to:
   in response to receiving the application layer network traffic, send to each of the other application layer audit proxies in the proxy network, a request for a length of a respective local data blockchain associated with a respective one of the other application layer audit proxies;
   receive, from each of the other application layer audit proxies, a response including the length of the respective local data blockchain; and
   based on the response from each of the other application layer audit proxies, select the longest blockchain among the other application layer audit proxies for writing new data into the audit log.

\* \* \* \* \*